US006701383B1

(12) United States Patent
Wason et al.

(10) Patent No.: US 6,701,383 B1
(45) Date of Patent: Mar. 2, 2004

(54) CROSS-PLATFORM FRAMEWORK-INDEPENDENT SYNCHRONIZATION ABSTRACTION LAYER

(75) Inventors: Andrew Wason, Atlantic Highland, NJ (US); Michael Mills, Red Bank, NJ (US); Chris O'Brien, New York, NY (US); Bruce A. Wallace, Short Hills, NJ (US)

(73) Assignee: Interactive Video Technologies, Inc., New York, NY (US)

( * ) Notice: Subject to any disclaimer, the term of this patent is extended or adjusted under 35 U.S.C. 154(b) by 0 days.

(21) Appl. No.: 09/338,188

(22) Filed: Jun. 22, 1999

(51) Int. Cl.[7] ............................. G06F 9/00; G06F 9/46
(52) U.S. Cl. ....................... 709/328; 717/100; 717/120; 717/121
(58) Field of Search ............................. 709/321, 104.1, 709/328; 345/900; 717/100, 120, 121

(56) References Cited

U.S. PATENT DOCUMENTS

| | | | | |
|---|---|---|---|---|
| 5,452,435 A | * | 9/1995 | Malouf et al. ............... | 395/550 |
| 5,680,639 A | * | 10/1997 | Milne et al. .............. | 715/500.1 |
| 5,893,106 A | | 4/1999 | Brobst et al. | |
| 5,903,728 A | * | 5/1999 | Semenzato ............. | 395/200.47 |
| 6,085,120 A | * | 7/2000 | Schwerdtfeger et al. ...... | 700/90 |
| 6,167,404 A | * | 12/2000 | Morcos et al. ............... | 707/102 |
| 2003/0079052 A1 | * | 4/2003 | Kushnirksky ............... | 709/328 |

OTHER PUBLICATIONS

Apple, QuickTime Technology Brief: QuickTime 3.0, Apr. 1997, Apple Computer.*
Sellers, QuickTime 3.0—an Overview, Maccentral.*
"An Open Medical Imaging Workstation Architecture for Platform–Independent 3–D Medical Image Processing and Visualization", Domagoj Cosic, Dec. 1997, IEEE Transactions on Information Technology in Biomedicine, vol. 1, No. 4, pp. 279–283.*
"ConverStation/2: An Extensible and Customizable Real-time Multimedia Conferencing System", Nakajima et al., May 1994, Multimedia Communications, pp. 9/1/1–9/1/6.*
"A Multimedia Teleteaching System Using an Electronic Whiteboard for Two–Way Communication of Motion Videos and Chalkboards", Nakajima et al., Jul. 1993, IEEE International Workshop on Robot and Human Communication, pp. 436–441.*
Day, B., Progress on the JMF and Java Media APIs, JavaWorld.com, Jun. 1999.
Jaworski, Jamie, Java Developer's Guide (1996).
QUE®, Special Edition Using HTML 4 (1997).
W3C®, Synchronized Multimedia Integration Language (SMIL) 1.0 Specification, Jun. 15, 1998.
Kramer, Douglas, The Java™ Platform, A White Paper, May 1996.
Introduction To Java Media Programming, JavaWord online, Jun. 1998.
Sun Microsystems et al., Java Media Players, Nov. 6, 1997.
Jaworski, Jamie, Java 1.2 Unleashed, 1998.

* cited by examiner

Primary Examiner—John Follansbee
Assistant Examiner—Diem Cao
(74) Attorney, Agent, or Firm—Jones Day (57) ABSTRACT

A method and system for extending an extensible framework is provided. An extension module for an extensible framework is coupled with an abstraction layer overlaying the extensible framework. The abstraction layer includes a uniform cross-platform interface between the extension module and the extensible framework.

41 Claims, 5 Drawing Sheets

```
(toc.rj)
<?xml version ="1.0"?>
<object
        classid = "com.softcom.realjava.plugins.RealTOC"
        codebase = "../../website/demos/plugins/codebase/"
        archive = "plugin.jar,sax.jar,aelfred.jar"
        width = "352" height ="350"
        sync = "1000"
        duration ="900000"
        >
        <param name ="URL" value ="toc.xml" />
</object>
```

*Fig. 4*

```
(toc.smi)
<smil>
    <head>
        <layout>
            <region id ="videoRegion" left ="0" top ="0"
Width ="176" height ="120"
                fit ="meet" />
            <region id ="tocRegion" left ="0" top ="120"
Width ="176" height ="200"
                fit ="fill" />
        </layout>
    </head>
    <body>
        <par>

<video id ="video"
src ="rtsp://demo.softcom.com/heat/video/heatsuresmooth.rm"
region ="videoRegion"/>
            <ref id ="toc" src ="toc.rj" region ="tocRegion"
                fill ="freeze" />
        </par>
    </body>
</smil>
```

*Fig. 6*

```
(toc.xml)
<?xml version ="1.0"?>
<TOC>
    <NODE BEGIN ="0ms" END ="38684ms">
        <TITLE>Acknowledgements</TITLE>
    </NODE>
    <NODE BEGIN ="38685ms" END ="57627ms">
        <TITLE>Body Temperature</TITLE>
    </NODE>
    <NODE BEGIN ="57628ms" END ="68999ms">
        <TITLE>Exercise</TITLE>
        <NODE BEGIN ="69000ms" END ="96757ms">
            <TITLE>Thermoregulatory System</TITLE>
        </NODE>
    </NODE>
    <NODE BEGIN ="96758ms" END ="126114ms">
        <TITLE>Course Overview </TITLE>
    </NODE>
    <NODE BEGIN ="126115ms" END ="319999ms>
        <TITLE>Body Temperature</TITLE>
    </NODE>
    <NODE BEGIN ="320000ms" END ="323335ms">
        <TITLE>Heat Related Illness</TITLE>
        <NODE BEGIN ="323336ms" END ="371783ms">
            <TITLE>Heat Fatigue</TITLE>
        </NODE>
        <NODE BEGIN ="371784ms" END ="398749ms">
            <TITLE>Heat Cramps</TITLE>
        </NODE>
        <NODE BEGIN ="398750ms" END ="437021ms">
            <TITLE>Heat Collapse</TITLE>
        </NODE>
        <NODE BEGIN ="437022ms" END ="510601ms">
            <TITLE>Heat Exhaustion</TITLE>
        </NODE>
        <NODE BEGIN ="510602ms" END ="560999ms">
            <TITLE>Heat Stroke</TITLE>
            <NODE BEGIN ="561000ms" END ="590898ms">
                <TITLE>Symptoms</TITLE>
            </NODE>
            <NODE BEGIN ="590899ms" END ="654966ms">
                <TITLE>Treatment</TITLE>
            </NODE>
        </NODE>
    </NODE>
    <NODE BEGIN ="654967ms" END ="900000ms">
        <TITLE>Precautions</TITLE>
    </NODE>
</TOC>
```

Fig. 5

CROSS-PLATFORM FRAMEWORK-INDEPENDENT SYNCHRONIZATION ABSTRACTION LAYER

APPENDIX AND COPYRIGHT NOTICE

This document includes a partial source code listing of a preferred embodiment of the applicant's invention. The code, listed in Appendix A and in the drawings, forms part of the disclosure of the specification. It is copyrighted. The copyright owner has no objection to facsimile reproduction by anyone of the patent document, including the copyrighted Appendix A and the drawings as they appear in the Patent and Trademark Office file or records, but otherwise reserves all rights.

TECHNICAL FIELD

This invention relates to the field of software plug-ins for multimedia file players and for other applications supporting ordered data flow files. More precisely, this invention defines a new field of software that allows plug-ins and content to be insulated from differences in underlying platforms and frameworks.

BACKGROUND OF THE INVENTION

Multimedia player frameworks have become widespread. Later versions of the most popular Internet browsers—Microsoft's Internet Explorer and Netscape's Communicator—include at least one player in the basic package. These are frameworks such as RealNetworks, Inc.'s RealPlayer™ G2 family (collectively, the "RealPlayer™"); Microsoft Corporation's Windows Media Technologies (NetShow™); Macromedia, Inc.'s Director™; Apple Computer, Inc.'s QuickTime™; and Sun Microsystems, Inc.'s Java™ Media Framework (JMF). Most of these frameworks are extensible by means of plug-ins discussed below; some, notably JMF, are extensible by means of applications built on top of the frameworks. By being extensible we mean that a particular framework supports a set of interfaces exposed for interaction with additional software modules or components.

A framework is a set of interfaces, e.g., API's and procedures, and a set of capabilities exposed for the purposes of extensibility. It need not operate on multimedia-type files, i.e., files ordered sequentially and supporting the concept of a time-line; frameworks generally need not operate on time- or otherwise-ordered data files. In the rest of this document, however, we will discuss predominantly frameworks operating on ordered data flow files. We will refer to such frameworks interchangeably as "frameworks," "extensible frameworks," "extensible data flow-based frameworks," or by similar expressions; we do not imply any difference in the particular designation used, unless otherwise indicated.

Frameworks are extended by means of extensions, for example plug-ins. Plug-ins, also referred to as extension modules, are modules or components dynamically loaded at run-time. Extensible architecture and plug-ins have been used in commercial products, the RealPlayer™ and Windows Media Technologies being two instances. They also have been described in various publications. See U.S. Pat. Nos. 5,838,906 and 5,870,559. (The specifications of these patents are incorporated by reference as if fully set forth herein.) A number of companies market plug-ins specifically for extending multimedia players.

OBJECTS OF THE INVENTION

One difficulty faced by plug-in developers is that a plug-in must be ported for each platform, i.e., for each hardware-operating system combination. Another difficulty lies in adapting a plug-in to various frameworks. Third difficulty, closely related to the first two, is that platform porting and framework adaptation require developers to have working knowledge of the various platforms and frameworks. One object of this invention is to provide a single interface that allows plug-in developers to build a single, platform independent version of a plug-in. Another object of this invention is to provide a uniform interface to the various frameworks so that a single plug-in can extend functionality of multiple frameworks. The third object of this invention is to facilitate development of content that can operate similarly, i.e., consistently, with different multimedia players (e.g., RealNetworks, Inc.'s RealPlayer™ and Microsoft Corporation's Windows Media Technologies (NetShow™)), and platforms (TV, PC, set-top boxes). The fourth object of this invention invention is to accelerate the development of content and multimedia plug-ins by promoting reuse of existing software objects (e.g., objects written in Java™ and JavaScript).

SUMMARY OF THE INVENTION

This invention is an abstraction layer providing a uniform interface between a framework and one or more plug-ins. In the preferred embodiment, the invention is a Synchronization Abstraction Layer (SAL) abstracting time-based frameworks into a common synchronization interface. The SAL synchronizes itself and other plug-ins to a time-line of the underlying framework—and it does that independently of the underlying framework. In other words, the plug-ins interact with the underlying framework through the SAL, rather than directly. Typically, the SAL is implemented on top of the synchronization of the Application Programming Interfaces (API's) provided by the underlying frameworks. It has at least one point of coupling with the underlying framework: a method for providing the SAL with the current time.

The SAL includes a uniform cross-platform interface for the plug-ins. Preferably, the cross-platform interface has a functional core independent of the specific framework underlying the SAL.

Some of the features of this invention are listed below:
1. Secure e-commerce, full interactive experiences including text and voice chat, games, graphics, animations, and advertising can be integrated and synchronized with streaming multimedia such as video and audio;
2. It can be used to build a content framework that insulates content and plug-in developers from details and differences in hardware platforms, so that the same content or plug-in can run on desktop platforms (PC, Macintosh, Solaris, Linux), Televisions (GI, SA), or other kinds of devices (AOL-TV, screen phones);
3. It can be used to build a content framework that insulates content and plug-in developers from specifics of, or differences in, software platforms, so that the same content or plug-in can run on Microsoft NetShow™, RealNetworks RealPlayer™, Apple Quicktime™, Sun Java™ Media Framework or any other media system;
4. It can run without a network or on different types of networks, such as wireless, Intranets, or the Internet;
5. It can be used to synchronize arbitrary data types, including text, chat, graphics, video, audio, and active content like Java™, JavaScript, or Flash;

6. The framework-independent layer can be implemented using different languages, including Java™, HTML, XML, JavaScript, VBScript, or other languages;
7. When used for video synchronization, it can be used to synchronize arbitrary datatypes with different spatial objects in video, and with different temporal objects in video.

BRIEF DESCRIPTION OF THE DRAWINGS

FIG. 3 is a high level diagram of a preferred embodiment implementation specific to a table of contents plug-in.

FIG. 5 lists a sample toc.xml, an XML descriptor file with detailed hierarchical description of the table of contents plug-in of FIG. 3.

DETAILED DESCRIPTION OF THE INVENTION

Figure 1:
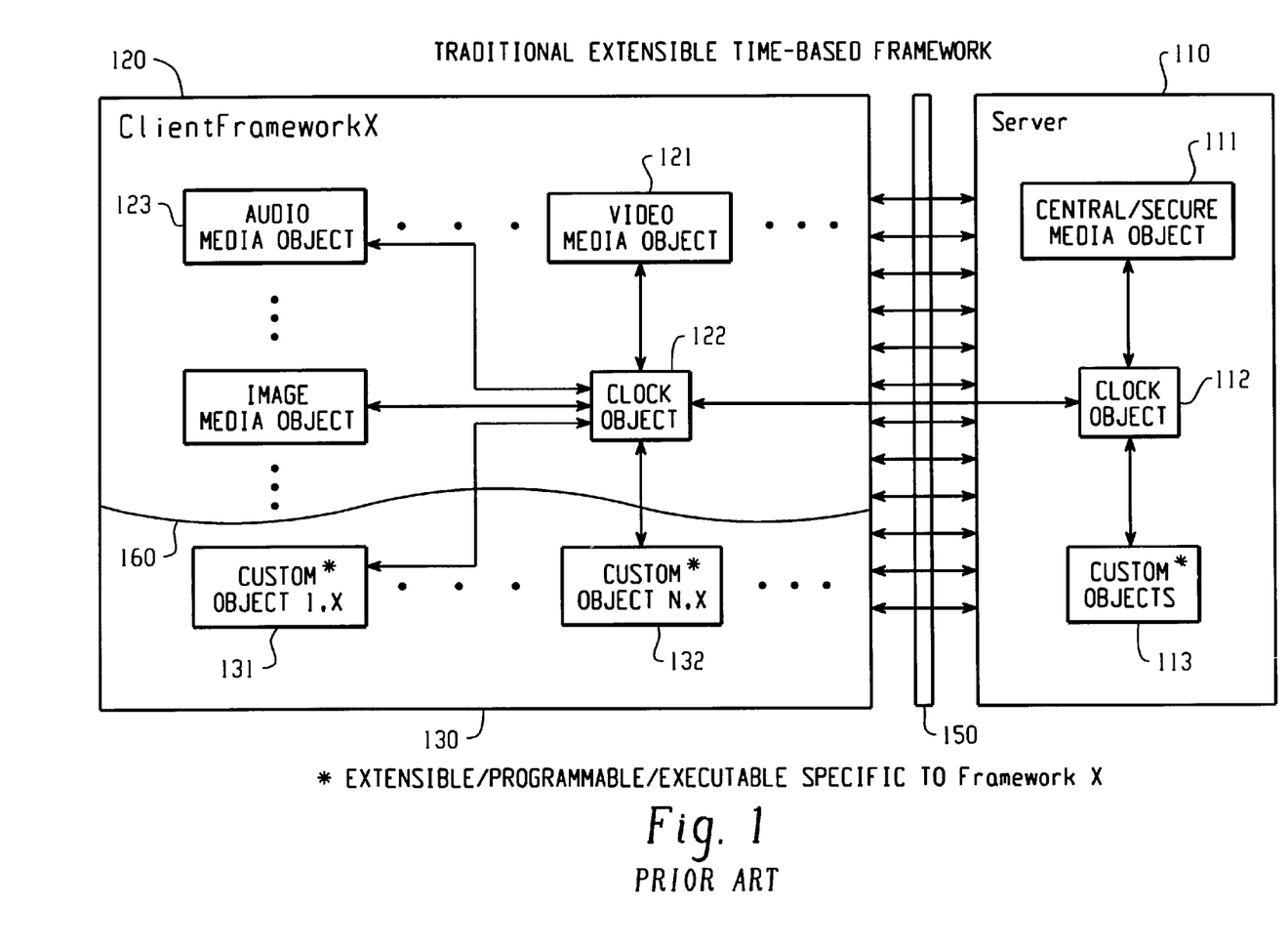
FIG. 1 is a diagram of basic processes in a traditional extensible time-based framework of prior art.

FIG. 1 depicts conventional operation of an extensible multimedia player framework connected to a media server. Server 110 includes Media Object 111, Clock Object 112, and Custom Objects 113. Framework 120 and Extension Module (plug-in) 130 coexist on the client side. As is usual for a media player, Framework 120 contains Video Media Object 121, Clock Object 122, and Audio Media Object 123. Extension Module 130 has Custom Objects 131 and 132. Server 110 connects to Framework 120 and Extension Module 130 through Network 150. Line 160 indicates the extensibility interface between Framework 120 and Extension Module 130. Note that this high level diagram of prior art omits many other components and processes, including an operating system and rendering means.

Figure 2:
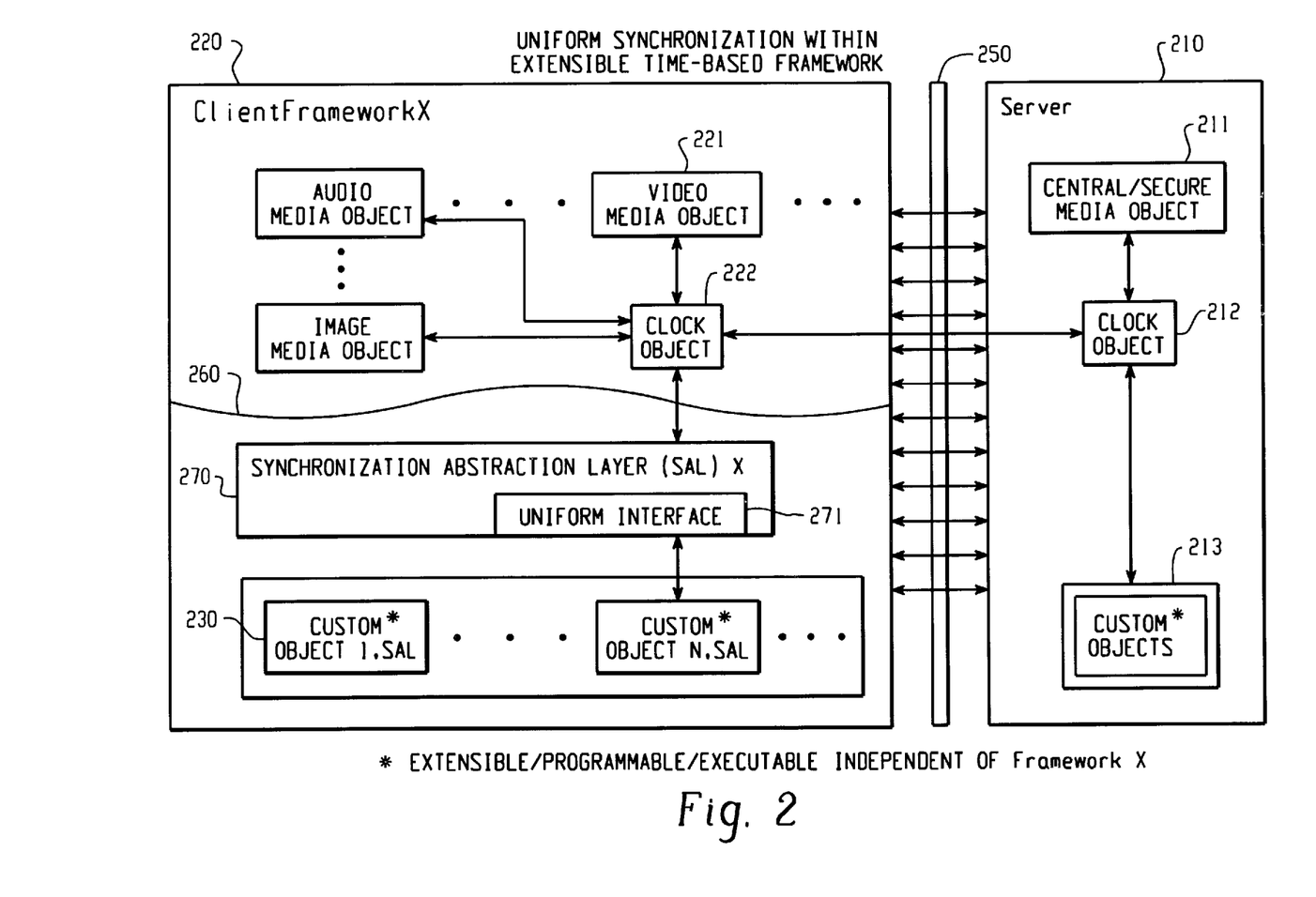
FIG. 2 is a diagram of basic processes in an extensible time-based framework incorporating the Synchronization Abstraction Layer in accordance with this invention.

FIG. 2 demonstrates an arrangement functionally similar to the arrangement of FIG. 1, but using the present invention. Server 210, including Media Object 211, Clock Object 212, and Custom Objects 213, connects to Framework 220, Extension Module (plug-in) 230, and Synchronization Abstraction Layer (SAL) 270 through Network 250. Line 260 symbolizes the interface extending Framework 220 through SAL 270. Block 271 denotes Uniform Interface between SAL 270 and various extension modules, including Extension Module 230.

As before, FIG. 2 omits many other components and processes, and is rather generalized. But a number of structural changes can be envisioned even in this, high level representation. For instance, media files can be stored locally, obviating the need for transmission over the network. Further, custom objects need not reside on the same server as the media files; they may be located on a separate server or, in some cases, locally. Several extension modules can be simultaneously connected to the same client framework, either through the SAL or directly. (The SAL itself is, of course, an extension module.)

The discussion above focused on media players rendering multimedia files supporting the concept of time-line, such as video and audio clips, because these applications are commercially important. The invention, however, is not limited to rendering multimedia or time-line ordered files. Time-line sequencing is only one example of data flow order within files, including media files. Many other types of ordering are possible. As one example, consider a video taken from a window of a car going down a highway. The images can be time- or distance-sequenced.

Files of interest in the present context, which we designate as ordered data flow files, may also be ordered in multiple dimensions. Imagine a video game called "Tank Commander," with the player controlling a virtual tank moving cross country. Because the tank can move in two dimensions, the top view of the tank and its immediate surroundings depends on two coordinates. The video data must therefore be ordered in two dimensions. Similarly, video of a one-directional view from an object moving in three dimensions requires three dimensional ordering. Clearly, the concept of ordered files goes beyond the four dimensions of space-time.

We also need not limit this concept to files ordered according to variables perceived as continuous, e.g., space and time. The concept is equally applicable to ordering according to discrete variables, such as event occurrences or quantized space positions. As an example, consider a server storing a library of books and sending the content to the client for sequential viewing page by page. The concept of ordered data flow files is therefore a general one.

Finally, in its general form the invention need not synchronize data flow, but may merely provide a uniform cross-platform interface for plug-ins.

Although the invention can be implemented in various languages, it is preferable to use a platform-independent source code. Therefore, consistent with the spirit of the invention, its preferred embodiment is implemented in Java™—an architecture-neutral, object-oriented, multi-threaded language intended for use in distributed environments. (Partial source code of the preferred embodiment is listed in Appendix A and constitutes a part of the disclosure of this specification.) The Java™ code is executed by a Java™ Virtual Machine (JVM), which is a byte-code interpreter. The JVM is stored in one location and instantiated separately for each extension module, eliminating the need to store duplicate copies of the JVM for other modules that are also implemented in Java™. Alternatively, the invention can instantiate a JVM from a copy in the framework, in the operating system, or even in another application.

The preferred embodiment creates a uniform interface to the RealPlayer™ of Real Networks. It can be easily adapted to extend other multimedia players in addition to the RealPlayer™, especially if a common set of functional features exists in the various players. This should be the case for most multimedia players. Because the Java™ code of a specific extension can be mostly independent of a particular framework being extended, large sections of the SAL's code can be shared among different framework adaptations of the same plug-in.

Figure 3:
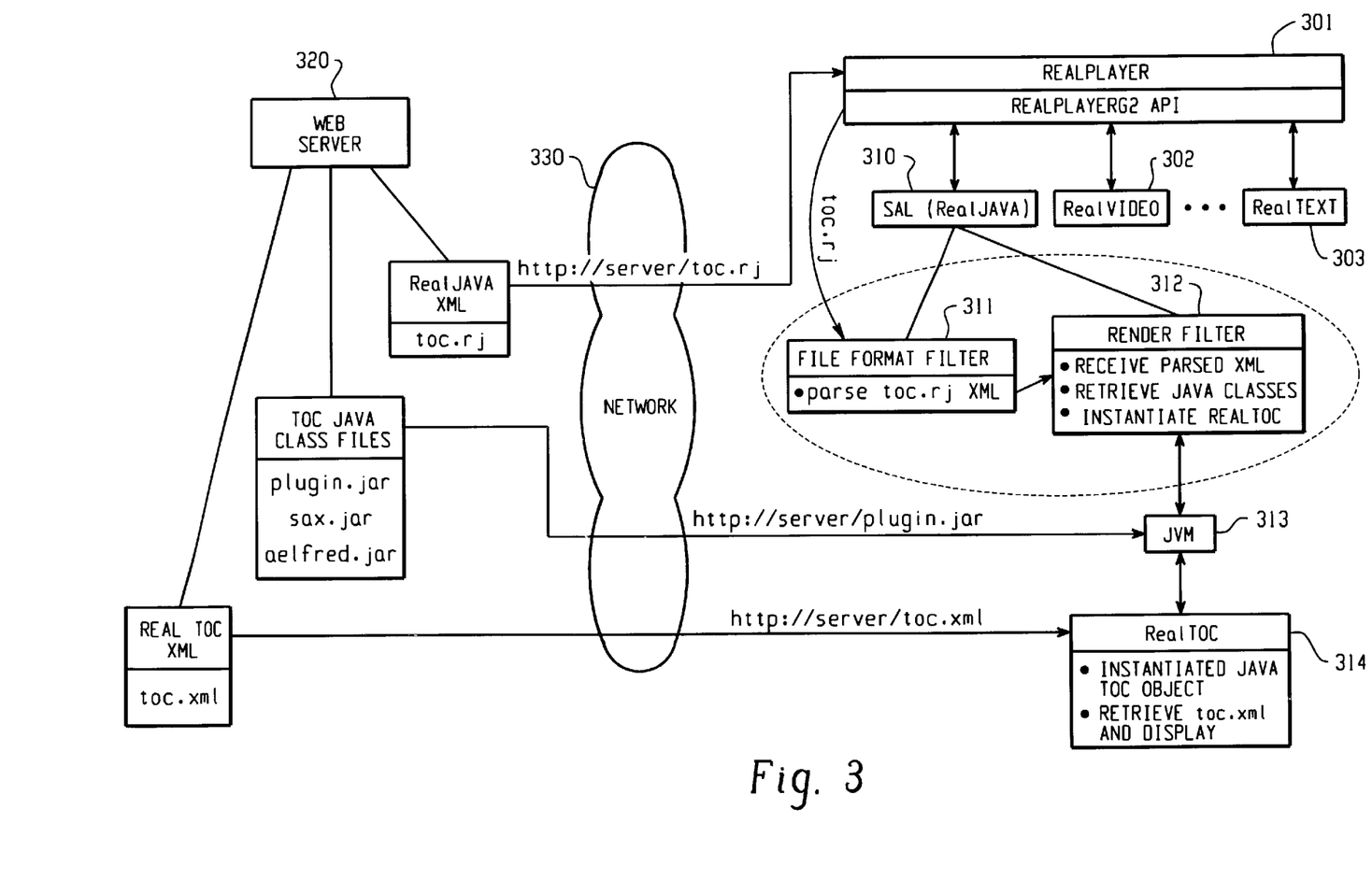

FIG. 3 illustrates a high level diagram of a more specific example of the preferred embodiment. Here, the SAL is used to plug-in a table of contents ("TOC") extension module into the RealPlayer™. The TOC plug-in displays a hierarchical view of the table of contents of a video presentation described in the table of contents. In the hierarchy, entries in the table are highlighted during the video presentation of their associated video portions. A user can randomly access various portions of the video by clicking on the corresponding entries in the TOC.

In this configuration RealPlayer™ 301 has three extension modules: SAL (RealJava) 310, RealVideo 302, and RealText 303. (Hereinafter we denominate by "rj" or "Real-Java" all Java™ objects compatible with the G2 architecture.) For clarity, SAL 310 is expanded within the dotted oval into its conceptual components—File Format Filter 311 and Renderer 312. This conceptual separation results from the G2 architecture constraints of the Real-Player™; in a SAL adaptation compatible with another media player, such conceptual separation may be inappropriate.

When a user invokes the RealPlayer™ application and the TOC extension module, RealPlayer™ 301 accesses Web Server 320 over Network 330 to retrieve "toc.smi," a synchronized multimedia integration language ("SMIL") descriptor file defining a set of synchronized plug-ins to run simultaneously in the RealPlayer™ environment. This file contains a reference to "toc.rj," an extensible markup language ("xml") descriptor file for the table of contents extension module compatible with the RealPlayer™. Based on the MIME type of the toc.rj file, RealPlayer™ 301 instantiates SAL 310 and routes the toc.rj file to it. SAL 310 includes File Format Filter 311 and Renderer 312, each implemented using Java™ code linked with native platform C++ code.

Figure 4:
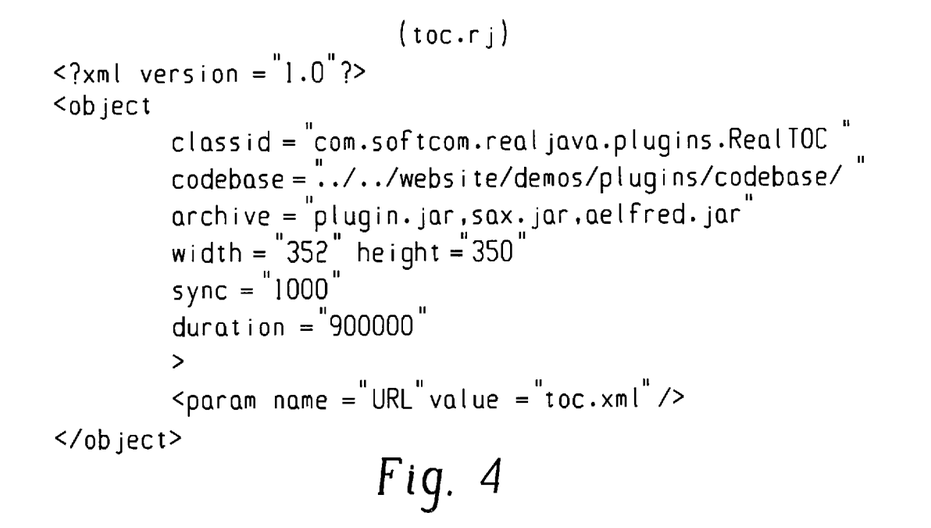
FIG. 4 lists a sample toc.rj, an XML descriptor file for a table of contents plug-in of the previous Figure.
Figure 6:
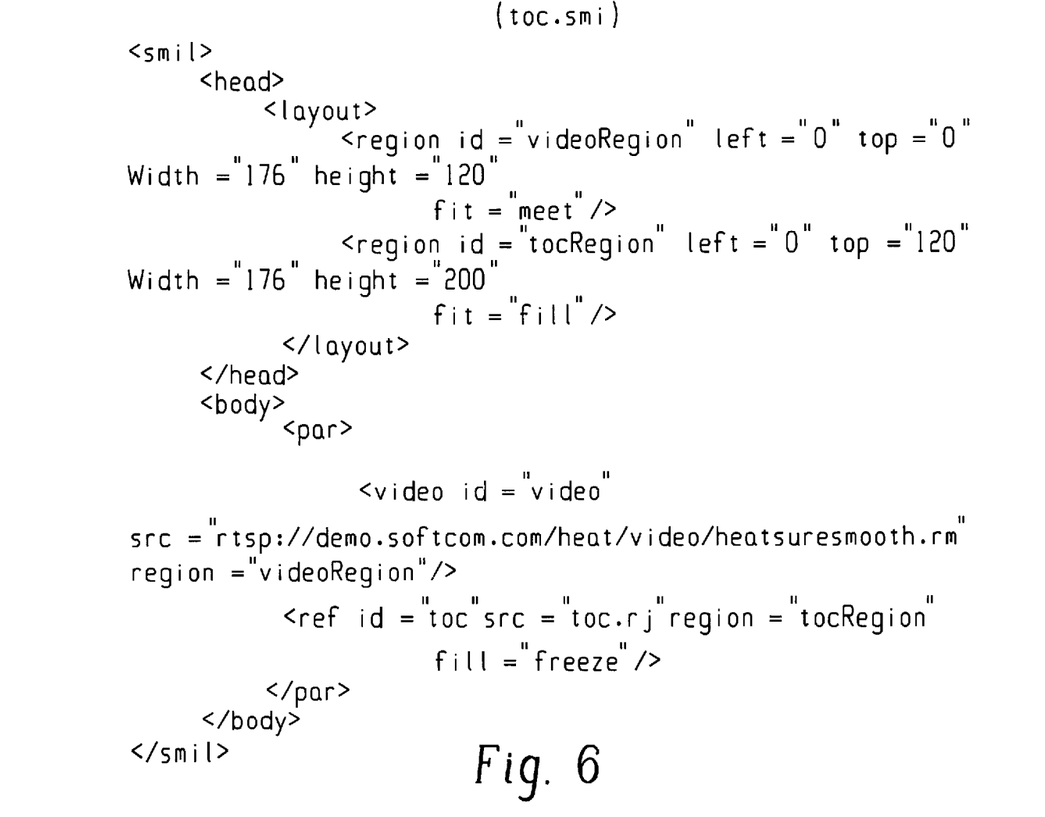
FIG. 6 lists a sample toc.smi, an XML file defining a set of synchronized plug-ins.

File Format Filter 311 parses the toc.rj file and hands it over to Renderer 312 through a standard protocol defined by the RealPlayer™. The parsed data contains following elements: (1) name of the Java™ class to instantiate; (2) location from which the Java™ class can be retrieved; and (3) any other parameters specific to the extension module. A sample toc.rj file appears in FIG. 4. The first line (starting with classid) specifies the Java™ class names; the next two lines (codebar and archive) specify a URL location and names of Java™ class files; the following line assigns the width and the height of the window for the table of contents; sync is the period in milliseconds between synchronizing events, i.e., between timing calls from the RealPlayer™ to the SAL; duration refers to total length of the time-line of the presented event; and, lastly, param is the parameter that points to the URL with the toc.xml file, the XML file descriptor of the specific table of contents.

Renderer 312 instantiates JVM (Java™ Virtual Machine) 313 needed to run the Java™ code, and also retrieves ".jar" files (packaged Java™ class files) over Network 330. Note that the URL for the ".jar" files is available from the parsed toc.rj file discussed above. Renderer also instantiates an instance of RealTOC object 314 and hands to it the URL for toc.xml, the XML file describing the specific table of contents object associated with the multimedia presentation. This file includes the nodes and sub-nodes within hierarchical structure of the specific table of contents; it also includes the "begin" and "end" times corresponding to each node and sub-node. RealTOC retrieves the toc.xml file, parses it, and builds the specific table of contents tree structure. A sample toc.xml file appears in FIG. 5.

At the beginning of the multimedia presentation, RealVideo object 302 creates a video window for rendering video, while RealTOC creates a TOC window for rendering the table of contents. Both windows are rendered within the larger RealPlayer™ window. As the time-line increases during the presentation, RealPlayer™ 301 periodically calls SAL 310 with the current time; SAL 310 passes the current time to JVM 313, which in turn notifies RealTOC 314; RealTOC 314 highlights the appropriate node on the table of contents tree rendered in the TOC window. A similar process can be constructed with the SAL keeping current time and calling the RealPlayer™ with time updates.

When the user clicks on a particular heading within the table, RealTOC 314 sends the "begin" time associated with the heading to the "seek" function of RealPlayer™ 301 through JVM 313 and SAL 310; RealPlayer™ 301 notifies all synchronized media servers (not shown) of the new "begin" time, waits for the all the media servers to synchronize to the new time, then updates its internal current time and sends the new current time to its extension modules, i.e., RealVideo 302 and SAL 310 (and RealText 103, if applicable); SAL 310 updates the current time of RealTOC 314 through JVM module 313. Importantly, both RealTOC 314 and RealVideo 302 are both synchronized to the current time of RealPlayer™ 301. Thus, after RealTOC 314 invokes the seek function requesting a new time, its current time does not skip to the new time until RealPlayer™ 301 notifies RealTOC 314 of the change in current time. If the seek function in RealPlayer™ 301 is disabled, as it should be for live video, the time line continues uninterrupted.

Seek function is only one example of controlling the flow of data. Fast forward and rewind functions also control the flow of data by changing the rate of the flow. Moreover, as discussed previously, the data can be arranged in multiple dimensions; then, its flow direction is a vector whose direction may be controlled from the extension module in a way similar to the control of data flow from the table of contents described above.

Although a specific embodiment of this invention has been shown and described, it will be understood that various modifications may be made without departing from the spirit of this invention.

We claim:

1. A method for extending an extensible framework that interacts with an operating system, comprising the steps of:
    providing the extensible framework;
    wherein the extensible framework comprises a separate layer from the operating system;
    providing an extension module for the extensible framework; and
    providing an abstraction layer overlaying the extensible framework, the abstraction layer including a uniform cross-platform interface between the extension module and the extensible framework,
    wherein the abstraction layer is compatible with a different type of extensible framework;
    wherein the uniform cross-platform interface is framework-independent.

2. A method for extending a first extensible ordered data flow-based framework, wherein the first extensible ordered data flow-based framework interacts with an operating system, comprising the steps of:
    providing the first extensible ordered data flow-based framework, wherein the first extensible ordered data flow-based framework comprises a separate layer from the operating system layer;
    providing an extension module for the first extensible ordered data flow-based framework;
    providing an abstraction layer overlaying the first extensible ordered data flow-based framework, the abstraction layer including a uniform cross-platform interface between the extension module and the first extensible ordered data flow-based framework, wherein the abstraction layer is compatible with a different type of extensible framework and the uniform cross-platform interface is framework-independent; and
    synchronizing the abstraction layer to data flow in the first extensible ordered data flow-based framework.

3. A method for extending a first extensible ordered data flow-based framework according to claim 2, wherein data of the data flow is arranged in time progression.

4. A method for extending a first extensible ordered data flow-based framework according to claim 3, wherein the first extensible ordered data flow-based framework is a multimedia presentation application, the method further comprising the step of rendering data-types included in the data.

5. A method for extending a first extensible ordered data flow-based framework according to claim 3, wherein said synchronizing step includes the step of the first extensible ordered data flow-based framework calling the extension module with current time.

6. A method for extending a first extensible ordered data flow-based framework according to claim 3, wherein said synchronizing step includes the step of the extension module calling the first extensible ordered data flow-based framework with current time.

7. A method for extending a first extensible ordered data flow-based framework according to claim 2, wherein data of the data flow is ordered in multiple dimensions.

8. A method for extending a first extensible ordered data flow-based framework according to claim 2, further including the step of the first extensible ordered data flow-based framework calling the extension module with current position of data.

9. A method for extending a first extensible ordered data flow-based framework according to claim 2, further including the step of the extension module calling the first extensible ordered data flow-based framework with current position of data.

10. A method for extending a first extensible ordered data flow-based framework according to claim 2, further including the step of the first extensible ordered data flow-based framework calling the extension module with current rate of flow of data.

11. A method for extending a first extensible ordered data flow-based framework according to claim 2, further including the step of the extension module calling the first extensible ordered data flow-based framework with current rate of flow of data.

12. A method for extending a first extensible ordered data flow-based framework according to claim 2, further including the step of the first extensible ordered data flow-based framework calling the extension module with current direction of flow of data.

13. A method for extending a first extensible ordered data flow-based framework according to claim 2, further including the step of the extension module calling the first extensible ordered data flow-based framework with current direction of flow of data.

14. A method for extending a first extensible ordered data flow-based framework according to claim 2, wherein data of the data flow represents discrete states.

15. A method for extending a first extensible ordered data flow-based framework according to any one of claims 2–14, wherein the abstraction layer includes a mechanism for executing platform-independent code.

16. A method for extending a first extensible ordered data flow-based framework according to any one of claims 2, 4, 5, or 6, wherein data of the data flow is packetized and transported to the first extensible ordered data flow-based framework over a network, and the abstraction layer includes a mechanism for executing platform-independent code.

17. A method for extending a first extensible ordered data flow-based framework according to any one of claims 3, or 7–14, wherein the data of the data flow is packetized and transported to the first extensible ordered data flow-based framework over a network, and the abstraction layer includes a mechanism for executing platform-independent code.

18. A method for extending a first extensible ordered data flow-based framework according to any one of claims 2–14, wherein the abstraction layer includes a Java Virtual Machine.

19. A method for extending a first extensible ordered data flow-based framework according to any one of claims 2, 4, 5, or 6, wherein data of the data flow is packetized and transported to the first extensible ordered data flow-based framework over a network, and the abstraction layer includes a Java Virtual Machine.

20. A method for extending a first extensible ordered data flow-based framework according to any one of claims 3, or 7–14, wherein the data of the data flow is packetized and transported to the first extensible ordered data flow-based framework from a server storing the data over a network, and the abstraction layer includes a Java Virtual Machine.

21. A method for extending a first extensible ordered data flow-based framework according to claim 20, wherein the first extensible ordered data flow-based framework is a RealPlayer.

22. A method for extending a first extensible ordered data flow-based framework according to any one of claims 2–14, wherein the abstraction layer is compatible with a second extensible ordered data flow-based framework and the uniform cross-platform interface is framework-independent.

23. A method for extending an extensible ordered data flow-based framework that interacts with an operating system, comprising the steps of:
   providing the extensible ordered data flow-based framework;
   wherein the extensible ordered data flow-based framework comprises a separate layer from the operating system;
   providing an extension module for the extensible ordered data flow-based framework;
   providing an abstraction layer overlaying the extensible ordered data flow-based framework, the abstraction layer including means for providing a uniform cross-platform framework-independent interconnection between the extension module and the extensible ordered data flow-based framework; and
   step for synchronizing the abstraction layer to data flow in the extensible ordered data flow-based framework;
   wherein the abstraction layer is compatible with a different type of extensible ordered data flow-based framework.

24. Apparatus for using an ordered file through applications including an extensible ordered data flow-based framework, an extension module, and an abstraction layer having a uniform cross-platform interface between the extensible ordered data flow-based framework and the extension module, the apparatus comprising:
   a computing machine running the extensible ordered data flow-based framework, the extension module, and the abstraction layer, wherein the extensible ordered data flow-based framework comprises a separate layer from an operating system operating on the computing machine;
   means for synchronizing the extension module and the extensible ordered data flow-based framework;
   means for providing content of the ordered file to the extensible ordered data flow-based framework;
   wherein the abstraction layer is compatible with a different type of extensible ordered data flow-based framework.

25. Apparatus for using an ordered file according to claim 24, further including means for rendering data-types included in the ordered file.

26. Apparatus for using an ordered file according to claim 24, wherein the means for providing content includes a network connection and a first server storing the ordered file.

27. A computer-implemented extension module for use with an extensible framework, comprising:
- a cross-platform, framework-independent file container;
- a data structure for handling data associated with the cross-platform, framework-independent file container;
- an interface that provides access to the data stored in the data structure;
- wherein the extension module is a cross-platform, framework-independent module through its interaction with a cross-platform, framework-independent abstraction layer;
- wherein the extension module's data is provided to the cross-platform, framework-independent abstraction layer through the interface.

28. An extension module according to claim 27, wherein the data associated with the cross-platform, framework-independent file container comprises audio data.

29. An extension module according to claim 27, wherein the data associated with the cross-platform, framework-independent file container comprises image data.

30. An extension module according to claim 27, wherein the data associated with the cross-platform, framework-independent file container comprises video data.

31. An extension module according to claim 30, wherein the video data is encoded in RealPlayer format.

32. An extension module according to claim 30, wherein the video data is encoded in Windows Media format.

33. An extension module according to claim 30, wherein the video data is encoded in Macromedia Director format.

34. An extension module according to claim 30, wherein the video data is encoded in QuickTime format.

35. An extension module according to claim 30, wherein the video data is encoded in Java Media format.

36. An extension module according to claim 27, wherein the data associated with the cross-platform, framework-independent file container comprises at least two data types selected from the group consisting of image data, audio data, and video data.

37. An extension module according to claim 27, wherein the data structure for handling data associated with the cross-platform, framework-independent file container is a file.

38. An extension module according to claim 37, wherein the file is a flat file.

39. An extension module according to claim 37, wherein the flat file is a text file.

40. An extension module according to claim 37, wherein the file is a binary file.

41. An extension module according to claim 37, wherein the data structure for handling data associated with the cross-platform, framework-independent file container is an object of the type associated with object-oriented programming.

* * * * *